United States Patent
Kanevsky et al.

(10) Patent No.: US 7,075,671 B1
(45) Date of Patent: Jul. 11, 2006

(54) SYSTEM AND METHOD FOR PROVIDING A PRINTING CAPABILITY FOR A TRANSCRIPTION SERVICE OR MULTIMEDIA PRESENTATION

(75) Inventors: Dimitri Kanevsky, Ossining, NY (US); Sara H. Basson, White Plains, NY (US); Peter G. Fairweather, Yorktown Heights, NY (US); Alexander Zlatsin, Yorktown Heights, NY (US)

(73) Assignee: International Business Machines Corp., Armonk, NY (US)

( * ) Notice: Subject to any disclaimer, the term of this patent is extended or adjusted under 35 U.S.C. 154(b) by 1059 days.

(21) Appl. No.: 09/661,728

(22) Filed: Sep. 14, 2000

(51) Int. Cl.
*G06F 3/12* (2006.01)
(52) U.S. Cl. ...................... 358/1.15; 704/235
(58) Field of Classification Search .............. 358/1.1, 358/1.5, 1.12, 1.13, 1.14, 1.15, 1.18; 704/235, 704/270, 251
See application file for complete search history.

(56) References Cited

U.S. PATENT DOCUMENTS

| | | | | |
|---|---|---|---|---|
| 5,280,430 A | * | 1/1994 | Woods et al. | 715/531 |
| 5,752,227 A | * | 5/1998 | Lyberg | 704/235 |
| 5,790,641 A | | 8/1998 | Chan et al. | 379/100.17 |
| 5,823,948 A | * | 10/1998 | Ross et al. | 600/300 |
| 5,875,436 A | * | 2/1999 | Kikinis | 705/34 |
| 6,031,526 A | * | 2/2000 | Shipp | 715/500.1 |
| 6,219,638 B1 | * | 4/2001 | Padmanabhan et al. | 704/235 |
| 6,513,003 B1 | * | 1/2003 | Angell et al. | 704/235 |
| 6,549,614 B1 | * | 4/2003 | Zebryk et al. | 379/75 |
| 6,738,784 B1 | * | 5/2004 | Howes | 707/104.1 |
| 6,850,609 B1 | * | 2/2005 | Schrage | 379/202.01 |

OTHER PUBLICATIONS

C.J. Chen, "Speech Recognition with Automatic Punctuation", *Proceedings of EuroSpeech 99*, 1:447-450.

* cited by examiner

*Primary Examiner*—Mark Wallerson
(74) *Attorney, Agent, or Firm*—Satheesh Karra, Esq.

(57) ABSTRACT

A system and method for providing a printing capability using peripheral or stand-alone devices are disclosed. In the system and method, portions of a multimedia presentation, transcribed text, or both are output to a printing device. In the preferred embodiment, transcribed text is output to a fax machine by means of a Real Time Transcription Fax Server, which can also interleave other material into the fax output, and/or synchronize the fax output with other devices, such as monitors and speakers.

40 Claims, 4 Drawing Sheets

SYSTEM AND METHOD FOR PROVIDING A PRINTING CAPABILITY FOR A TRANSCRIPTION SERVICE OR MULTIMEDIA PRESENTATION

BACKGROUND OF THE INVENTION

1. Field of the Invention

This invention relates to a device and method for printing transcriptions of meetings, events, etc., and in particular, to a system and method of printing a transcription on a fax in real time.

2. Description of the Related Art

Transcriptions, whether created by a computer running an Automatic Speech Recognition (ASR) program or by a stenographer, are typically displayed on a computer monitor in real time. Thus, when depositions, meetings, speeches, etc. are transcribed, the transcribed text appears line by line on a computer screen. However, a computer monitor may not always be available to display the transcribed text in real time. Indeed, even in environments which have computer monitors, they may not be available for the purpose of displaying real time transcribed text, because they are being used for other functions.

In a similar vein, with the spread of embedded technologies and smaller computer units, such as palm-tops, the ability to provide portable transcription service will become more important. But the small screens on such devices are ill-suited for displaying transcribed text.

Therefore, there is a need for additional devices that are capable of displaying transcribed text in real time, as well as a method to provide such functionality to those devices. In addition, this system and method should use a device that is present in most working environments to provide this functionality.

SUMMARY OF THE INVENTION

One aspect of this invention is to provide a transcription system and method that allows the use of a facsimile (fax) machine to display transcribed text.

Another aspect of this invention is to provide a system and a method for the use of fax machines in multimedia presentations.

Yet another aspect of the invention is to provide a system for other peripheral or stand-alone devices to provide a printing capability for a transcription service or a multimedia presentation.

These and other aspects are fulfilled by the proposed system and method for using printing devices for transcribed text or a multimedia presentation is proposed. Using the system and method, a printing capability using peripheral or stand-alone devices is realized. In the system and method, portions of a multimedia presentation, transcribed text, or both are output to a printing device. In the preferred embodiment, transcribed text is output to a fax machine by means of a Real Time Transcription Fax Server, which can also interleave other material into the fax output, and/or synchronize the fax output with other devices, such as monitors and speakers.

BRIEF DESCRIPTION OF THE DRAWINGS

The foregoing and other objects, aspects and advantages will be better understood from the following detailed description of preferred embodiments of the invention with reference to the following drawings. In the drawings, the same reference numbers in different drawings denote the same objects.

DETAILED DESCRIPTION OF THE PREFERRED EMBODIMENT

In the following description of the preferred embodiment of the present invention, many specific items are described, but these details are provided only for a complete understanding of the present invention, and thus it will be understood by those skilled in the art that the present invention can be performed without such specified items or with modifications thereof. Detailed descriptions of certain items that are well-known to one with skill in the art are omitted in order that the description of the preferred embodiment not be overwhelmed with irrelevant details.

In the preferred embodiment of the present invention, a fax machine is enabled to provide a printout of real-time transcribed text, as well as multimedia presentations. A real-time transcription fax print server, which can perform the appropriate translations and fax machine commands, receives transcription or multimedia data, processes it, and forwards the data to the appropriate peripheral units. In this and the following description, the term "server" is used in a generic functional sense. In other words, the term "server' should be understood within the client/server architectural model—the client requests a service, the server provides a service. Thus, the real time transcription fax print server described below may exist as any combination of software, firmware, or hardware. However much of the print server is implemented in software, firmware, or hardware is open to many variations, as is well known in the art. The clients also may take any form—whether a transcription program resident on a personal computer (PC), a stenographer typing into a stenograph writer, multimedia presentation software, etc.

Furthermore, the terms "network" and "computer" are used in the most general sense. A "computer" is any computing means, from a single microprocessor or micro-controller to a computer system distributed over multiple processing nodes. A "network" includes any means that connects devices, whether computers, telephones, or other devices. Other terms in the text are also to be understood in a generic functional sense, as would be known by one skilled in the art.

Figure 1:
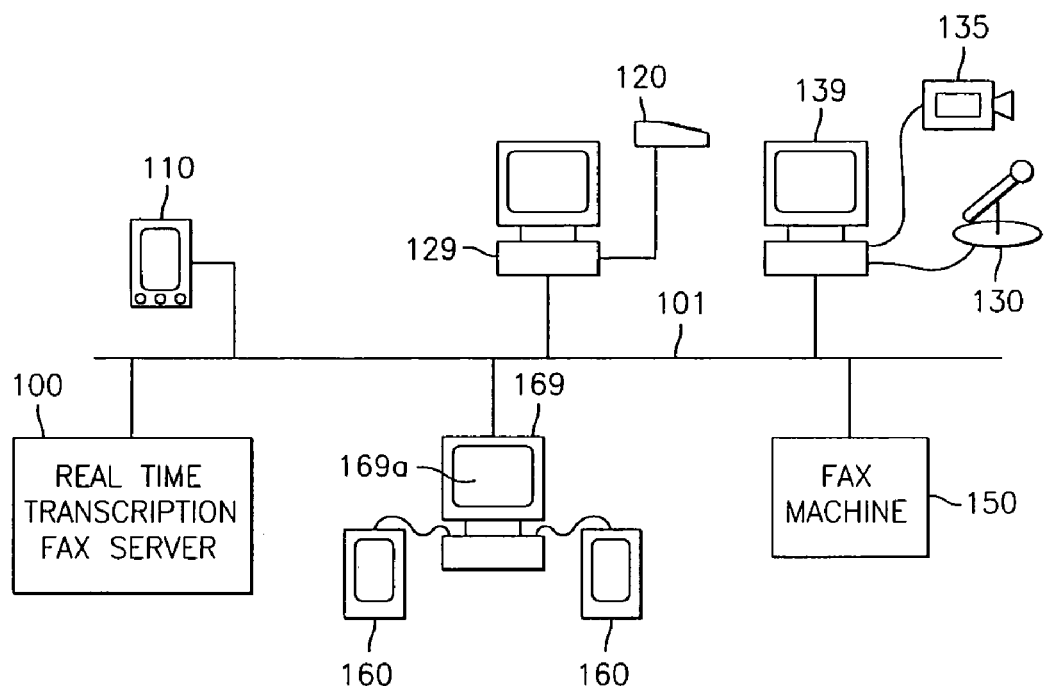
FIG. 1 is a block diagram of a real time transcription fax system according to the preferred embodiment of the present invention.

An overview of the preferred embodiment of the present invention will be described with reference to FIG. 1. In FIG. 1, the real time transcription (RTT) fax print server 100 is connected to an Ethernet local area network (LAN) 101.

Also connected to LAN 101 is a Personal Digital Assistant (PDA) 110, which has a built-in microphone and resident Automatic Speech Recognition (ASR) software, a computer 129, which is connected to a stenograph writer 120 and has a program to translate stenograph input into text, and a computer 139, connected to a camera 135 and a microphone 130. These devices represent some of the different forms of input that may be used with the preferred embodiment. Each input device has the capability of turning spoken words into text, whether by ASR (in PDA 110 and computer 139) or by a human stenographer with a stenography translation program (resident in computer 129). This text is sent to the RTT fax print server 100, which processes it in such a manner that it can be output to fax machine 150. The output could also go to a fax program on a computer 169, a fax palm device, or an embedded miniature fax device.

The real time transcription fax print server 100 is not shown as embodied in any particular device in FIG. 1, as it could be implemented in any of the computers 129, 139, or 169, in PDA 110, embedded in stenograph writer 120, or embedded in microphone 130. It should be noted that, although the preferred embodiment uses Ethernet LAN 101, any connection between the RTT fax print server 100, the input/transcription device, and the fax machine 150 could be used. For example, in another embodiment, the RTT fax print server is realized in a transcription-enabled PDA, which is connected directly to a fax machine by a telephone wire.

It should be noted that, although it is termed a "real time transcription fax print server" in reference to the preferred embodiment, the print server does not necessarily translate "transcriptions", but may deal with graphics, images and the like, as described below. Furthermore, the print server does not necessarily output to a "fax", but may output to a printer, or to fax emulation software running on a processor. Lastly, the print server does not necessarily have "real time" input, but may take input from a storage means.

Computer 139 is capable of multimedia presentations, and could be used for a real time videoconference, a televised speech, or an audio/video (a/v) presentation. When this is used, a participant or viewer with access to computer 169 and fax machine 150 will have enhanced capabilities by means of the RTT fax print server 100. For example, if an a/v presentation is being given, the viewer could listen by means of speakers 160, watch the presenter on the monitor of computer 169, and simultaneously receive additional text or imagery by means of fax machine 150. Furthermore, the fax machine, through use of the RTT fax print server 100, could be used to print out other forms of continuous streaming data, such as stock quotes or news flashes, while the reader is using computer 169 for other purposes.

Now, a more in-depth description of the modules comprising RTT fax print server 100 will be described with reference to FIG. 2. An input/output (I/O) Communication Module 210 is the interface with network 101, thus providing the capability to both receive and transmit information from other devices connected to network 101. Connected to the I/O Module 210 are Fax Connection Module (FCM) 220, Multimedia Integration Module (MIM) 230, Multimedia Separation Module (MSM) 240, and Audio Fragment Management Module (FMM) 250.

FCM 220 manages the connection between the RTT fax print server 100 and fax machine 150. It may be initialized with one network address for the fax machine 150, but it may be informed of the appropriate fax machine network address by user input or network management programming. FCM 220 activates, maintains, and deactivates connections with one or more fax devices. One of the primary purposes of FCM 220 is to stop the activated fax device from "timing out". In normal usage, a fax device receives a continuous stream of data, and, when there is prolonged delay, the fax device considers the communication concluded and times out. For example, in the International Telecommunications Union (ITU) T.30 protocol, the delay tolerance is 3 seconds±15%, or 2.55 to 3.45 seconds, meaning that the connection will be terminated on the fax machine side if no data is received for that period of time. However, when a conversation is being transcribed, there may be long pauses between sentences, or there might be a pause as the transcription software or stenographer catches up, which would result in the fax machine timing out.

There are various means to prevent this timing out without necessarily altering the transmission protocol, and one such means is described in U.S. Pat. No. 5,790,641 to Chan et al. (hereinafter, the '641 patent), which is hereby incorporated by reference. The '641 patent solves the time out problem by generating and transmitting delay signals to the connected fax, thus reinitializing the internal time-out counter and forestalling the time out. These delay signals are transmitted repeatedly to maintain the connection and can be used with any transmission protocol, without modifying the transmission protocol. In the preferred embodiment, the different delay tolerances of various transmission protocols are stored in FCM 220 and are automatically selected depending on the connected fax device. The FCM 220 deactivates the connection based on signals from the transcription service, such as when a stenographer presses a certain button indicating that transcription has ceased.

Multimedia Integration Module 230 provides the ability to integrate images or graphics into the transcription data being transmitted to the fax machine. In other words, these images or graphics are translated into a format readable by fax machine 150. Using these means, input in the form of stills from camera 135, computer-stored images, or graphics accompanying an a/v presentation could be output on fax machine 150. The MIM 230 will be described in greater detail below, with reference to FIG. 3.

Multimedia Synchronization Module 240 takes a combined multimedia signal input, separates out the different types of data, such as transcribed text, audio signals, or video signals, for separate output devices, and synchronizes the separate outputs. In other words, the MSM 240 is used when the multimedia output is being sent to more than one peripheral device, whereas MIM 230 is used when the multimedia output is all going to fax machine 150 (or a fax program on a computer).

For example, if a videoconference was taking place where there is video input through camera 135, audio input through microphone 130, both of which are used to create a MPEG (Moving Pictures Engineering Group) signal by computer 139, and the computer 139 is also creating a transcribed text, this combined videoconference multimedia signal would be output on network 101. The MSM 240 would receive this signal, separate out its components, synchronize the components, and send them to computer 169 and fax machine 150. Thus, a user at computer 169 would see video output on screen 169a, audio output through speakers 160, and transcribed text printing out on fax machine 150. In other embodiments, the MSM 240 can be left out of the RTT fax print server 100 in order to conserve space. For instance, if the RTT fax print server was implemented in a PDA, which has a limited memory capacity, the MSM 240 may be omitted so that the PDA only has the ability to print transcribed speech to a fax machine or fax program. The MSM 240 will be described in greater detail below, with reference to FIG. 4.

Audio Fragment Management Module (FMM) 250 keeps data in a buffer in order to manage the fragments (or phrases) of conversation being transcribed. Since most fax devices use single page printers, the preferred embodiment of the present invention breaks transcribed text up into fragments in order to ensure that completed fragments appear on a single page, rather than spread across two pages, which may be confusing. In addition, the FMM 250 ensures that the output is more intuitive, and understandable to the reader. The granularity of the fragments may be set by the user or automatically. The granularity may be small, such as a word, or large, such as whole sentences. Thus, if the fragment granularity was set to a word, the FMM 250 would store a formed word in the buffer, determine if there was enough room to fit the word on the current page being printed on fax machine 150, and either form feed the current page if the word was too large, or print it on the current page if there was room. Similarly, with granularity set to a sentence, the FMM 250 would store a formed sentence, determine if there was room, and form feed or print to the current page based on the sentence size and the amount of room left on the current page.

If a phrase were the chosen fragment granularity, the FMM 250 would break up sentences where a punctuation mark was expected, and keep those sections, or phrases, intact when printing. This may be done, for example, by using the pauses in spoken speech, as described in "Speech Recognition with Automatic Punctuation", C. J. Chen, Proceedings of EuroSpeech 99, 1:447–450. Other methods of defining fragments use language models, Natural Language Understanding (NLU), etc.

Control Module 260 stores control information and parameters for the operation of the RTT fax print server 100. Control information includes input and output parameters and is further described in connection with FIG. 6 below. The Control Module 260 retains information concerning peripheral devices attached to network 101. This peripheral device information may be collected by Control Module 260 automatically, by some sort of ping plug'n'play function, or may be input by a user. Control Module 260 determines whether incoming signals should be directed towards MIM 230 or MSM 240 based on user specifications.

Figure 2:
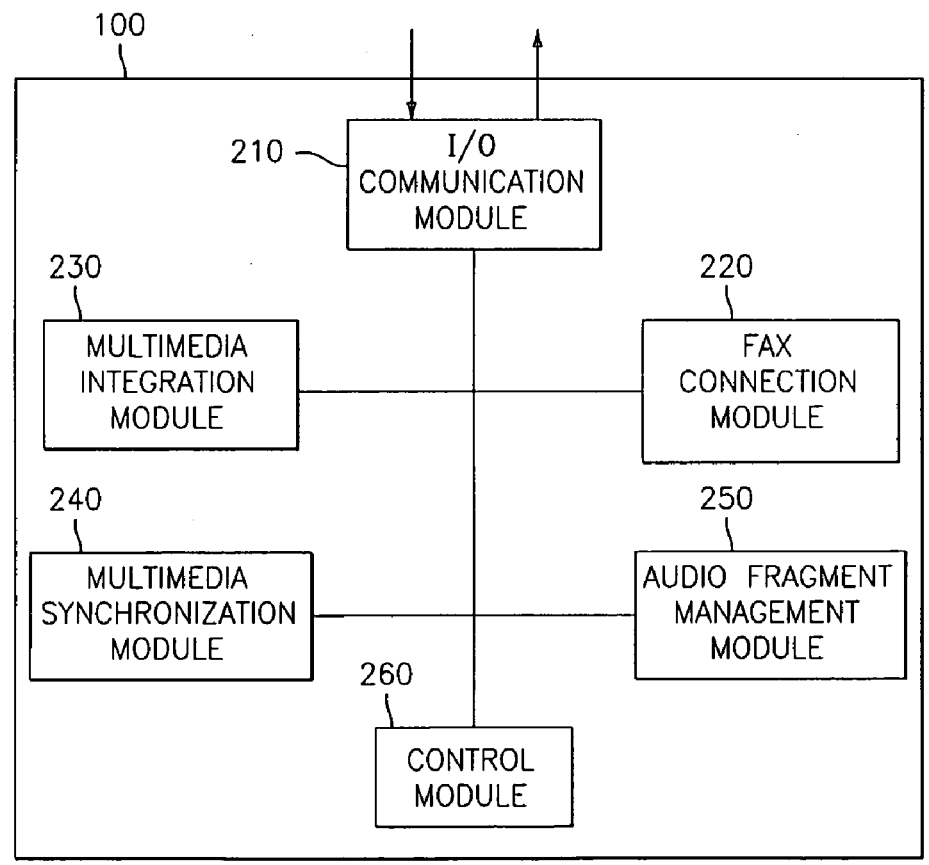
FIG. 2 is a block diagram of the modules comprising a real time transcription fax server according to the preferred embodiment of the present embodiment.

Although FIG. 2 shows a shared bus 205 for communication between the modules, this is only an abstraction, as the modules may be programs running on the same processor, or hardware with dedicated communication lines.

Figure 3:
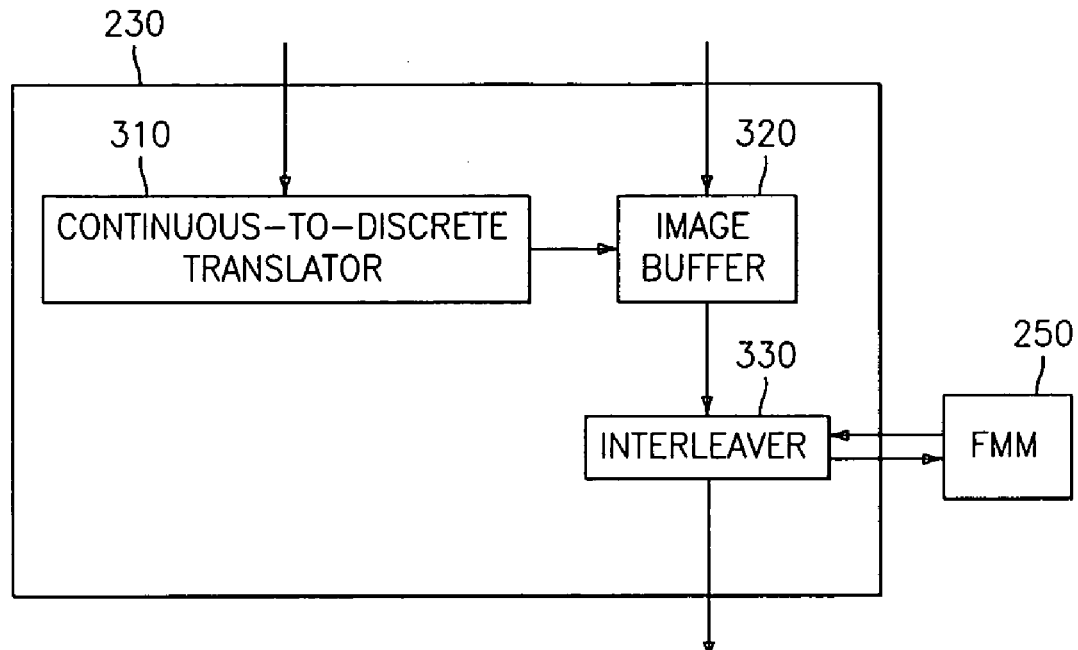
FIG. 3 is a block diagram of the Multimedia Integration Module according to the preferred embodiment of the present embodiment.

FIG. 3 shows the details of MIM 230. When the MIM 230 is used, both video and transcribed text is output to fax machine 150. The video may be any format, whether still pictures, drawings, moving pictures, etc. If the video is in the form of a continuous moving picture, which the fax machine cannot print, the input video signal is sent to Continuous-to-Discrete Translator 310. The C/D translator either selects or creates still images from the incoming continuous video stream using criteria selected either by the user or by the RTT fax print server 100 itself. For example, the time interval between "snapshots" should be chosen, as well as the resolution of the image, and the size of the image to be printed on the fax machine (e.g., 2×2 inches). In addition, other options may be available to the user, such as a cropping ability, where the user chooses one section of the incoming video signal to print, and the rest of the video data is ignored.

An image buffer 320 stores the next image to be printed on the fax machine. The image consists of either a still from the C/D translator 310 or an image directly input in the incoming data stream. If directly input, the image buffer 320 may have to partially reconstruct the image as it is buffering it. The image buffer 320 awaits directions from an Interleaver 330 before sending the buffered image to fax machine 150 through I/O module 210.

The Interleaver 330 interleaves the images between the transcribed text in the fax machine printed output. The Interleaver 330 may rely on instructions from the user or an external program for appropriate placement of images, or may provide its own algorithm for splitting up the text, based on the nature of the incoming signal. For example, the user may want an image of the speaker to print out after every seventh line of transcribed text. Or an external program might indicate to Interleaver 330 that a particular diagram should be placed in the fax printout after a particular word in the transcribed text. This could happen in the instance that a speaker is showing slides during a presentation. Or the Interleaver (or Control Module 260) may determine whether to insert an image based on the size of the fragments to be printed and the lacunae in the speech or conversation being transcribed.

The Interleaver 330 works closely with FMM 250 to properly interleave the image between the lines or fragments of text. In the case where the C/D Translator 310 is taking snapshots of an incoming video stream, the image buffer stores a time index associated with the captured still image. Similarly, the FMM 250 would maintain a time index associated with each fragment. The Interleaver 330 would use these two time indices to determine where to place the image in the fax output.

Figure 4:
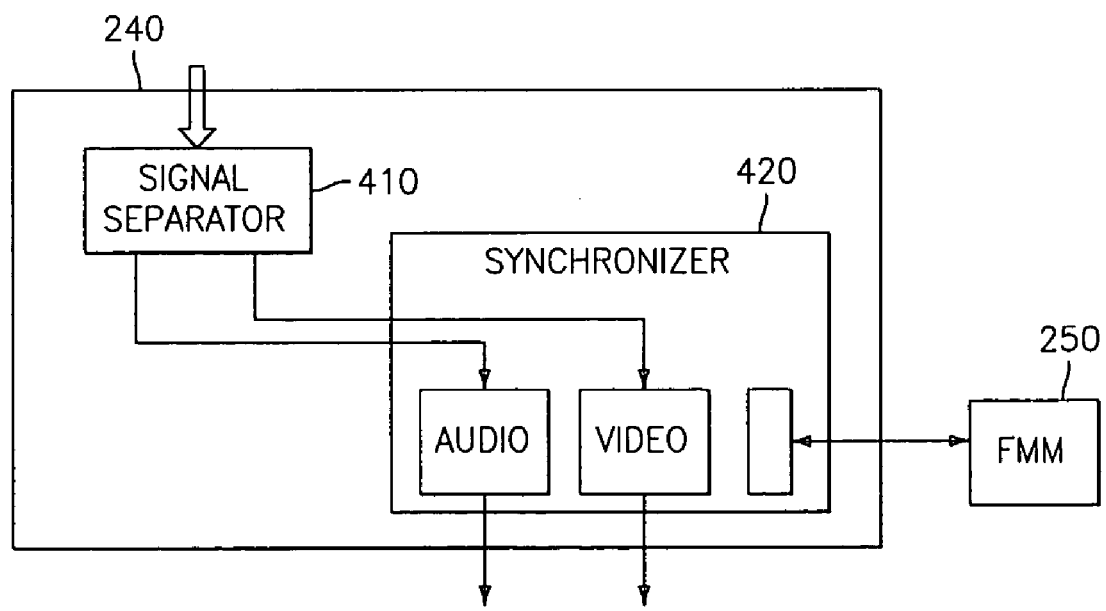
FIG. 4 is a block diagram of the Multimedia Synchronization Module according to the preferred embodiment of the present invention.

FIG. 4 shows the details of MSM 240. First, the combined incoming signal is segregated into its various data types by Signal Separator 410. Data segregation can be performed by many different methods, and many of the old and new methods are described in U.S. patent application Ser. No. 09/137,966, the contents of which are hereby incorporated by reference. Synchronizer 420 is responsible for aligning the a/v presentation on the various peripheral devices. If the audio and video data are already time-aligned by the multimedia software resident in computer 139, the Synchronizer 420 receives both data signals and temporarily buffers them. The time index of the transcribed text being buffered in fragment form is communicated from FMM 250. Because the stenographer or transcription program may introduce a delay between the a/v signal and the transcribed text, the Synchronizer 420 buffers the a/v signals until the transcribed text is more closely synchronized with the a/v signals and then outputs the a/v signals. This synchronization delay time is either automatically set by Control Module 260 or set by the user.

On the other hand, if the user is engaged in a videoconference, the user may wish to keep the a/v signals in real-time so that he or she may interject or respond in a timely manner. In this case, the Synchronizer 420 will not buffer the a/v signals, and there will be a resulting delay in the transcribed text being output on fax machine 150.

The Synchronizer 420 is also capable of synchronizing output to several different printers or fax machines. In this case, the stenographer or stenographic program would have the ability to add labels to the transcribed text in order to classify different portions of the text. For example, the transcribed text might be labelled by level of importance, with the most important text being output to a particular printer or fax machine, and the remaining text being output to other printers or fax machines.

Figure 5:
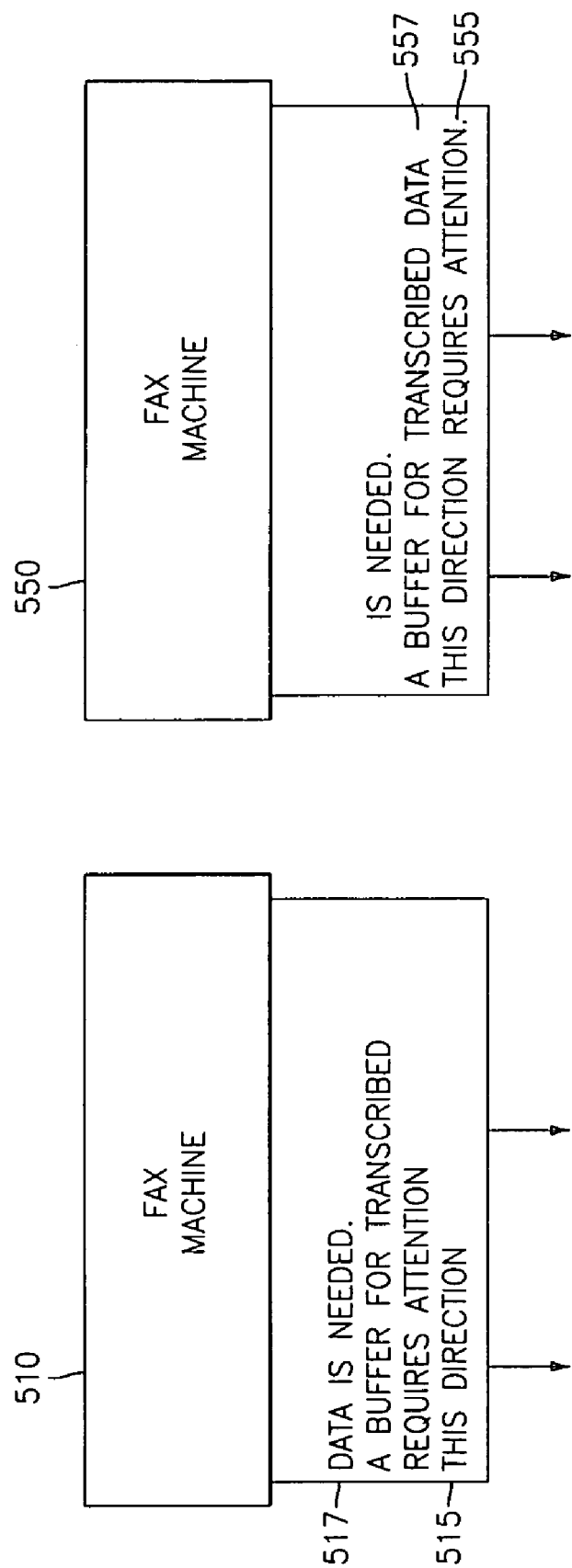
FIG. 5 is a block diagram showing the advantages of the Fragment Management Module according to the preferred embodiment of the present invention.

FIG. 5 shows another function that must be performed by FMM 250. Because fax machines have different directions of output, the buffering of fragments may have a more drastic effect on the printed transcription, which makes the text difficult to read. As an example of an difficult-to-read transcription, fax machine 510 in FIG. 5 prints out from the bottom of the page, thus first sentence 515 ('This direction requires attention.") appears after second sentence 517 ("A buffer for transcribed data is needed."). Because the sentences are chopped up awkwardly, and the sequence is bottom-to-top, rather than top-to-bottom, reading the transcribed text is counter-intuitive. However, if the FMM 250 stores the transcribed text in a buffer, and then outputs comprehensible fragments before starting a new line. For example, fax machine 550 in FIG. 5 also prints its output from the bottom of the page, but FMM 250 controls the output so that first sentence 555 ("This direction requires attention") and second sentence 557 ("A buffer for this transcribed data is needed") appear in more easily understandable portions.

In addition, if the stenographer or stenographic program has the labeling capability discussed above, the FMM 250 may also alter the appearance of certain text or the speed of printing. For instance, if the stenographer or stenographic program labels something to indicate it was said with particular emphasis, the FMM 250 may print that labeled material in a larger font, or in bold, etc. Furthermore, the labels inserted by the stenographer or stenographic program might also indicate to print a particular phrase or fragment more quickly in order that the immediacy of highly relevant parts of the conversation is not lost. This might be done by increasing the font size, thereby causing the lines printed per minute to rise.

Lastly, the FMM 250 is also used to overcome limitations of particular printers or fax machines. For example, in some fax machines, there is a certain amount of time and distance before printed text becomes visible. This would introduce a time lag in following the conversation. To fix this problem, in the preferred embodiment of the present invention, the FMM 250 would add several returns after each printed fragment, so that the printed fragment becomes immediately visible.

Figure 6:
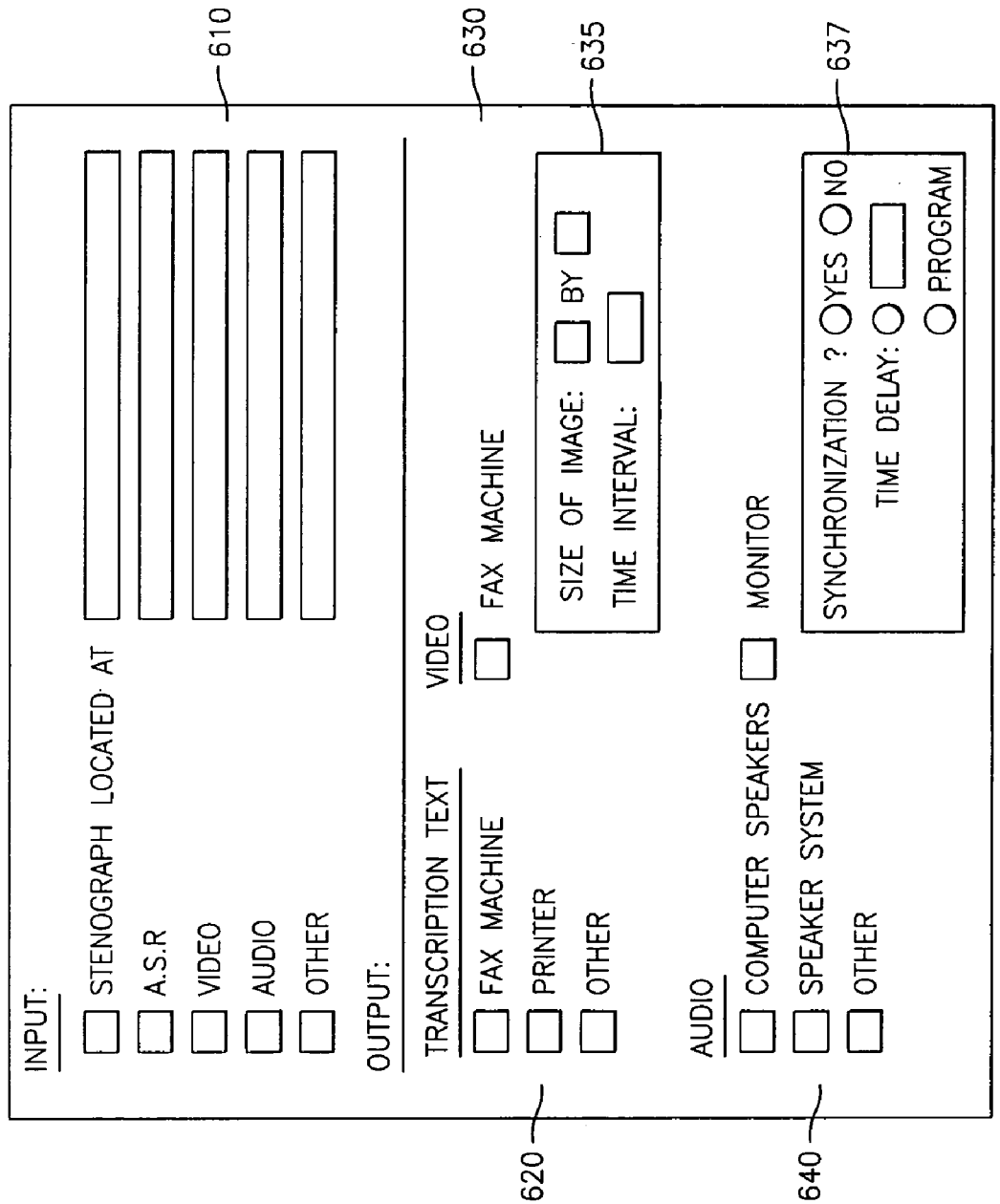
FIG. 6 is a drawing of an input dialog box for a user to indicate the parameters of a real-time transcription according to the preferred embodiment of the present invention.

FIG. 6 shows an input dialog box for a user to input control information and parameters for the Control Module 260 to control the RTT fax print server 100. Input 610 allows the user to select the number and location of the peripheral devices providing the input to RTT fax print server 100. Text 620 is for the user to select where the transcribed text will be output, either a fax machine or a printer, and the location of the output device. The output device could also be the port of a computer, where a computer fax program will take the input. Video 630 has three choices: fax machine, monitor, and other. If fax machine is selected, option box 635 would need to be filled out by the user as well. Option box 635 includes an entry box for the size of the image to be printed on the output page, and a interval time setting for snapshots of a continuous stream moving picture display. If monitor is selected and the input video is detected as continuous, the user will have to fill in option box 637. Namely, the user will have to indicate whether the transcribed text will be synchronized with the video or not. If the video is to be transcribed, the user needs to indicate the amount of time the continuous video signal stream will be delayed, or let the program determine a flexible time delay.

Audio 640 has three choices: computer speakers, speaker system, and other. The computer speakers box is selected when a computer system is being used, such as speakers 160 attached to computer 169 in FIG. 1. The speaker system box is chosen when there is a separate audio facility, which is not necessarily connected to a computer system, available on the network. In the preferred embodiment, the locations of output devices are not entered in dialog box 600. This is either because the information is entered in a dialog box that appears after dialog 600, or because the user has previously installed default values that are retained by Control Module 260.

The preferred embodiment described above is for a real-time transcription to a fax machine. In other embodiments, a multimedia presentation might be recorded on a computer-readable medium, and be played back through the RTT fax print server 100 as a continuous stream. In addition, the RTT fax print server 100 may not output transcribed text or video images to the fax machine, but other types of printed text. For instance, during an a/v presentation concerning taxes, a sample tax form could print out on the fax machine so that the viewer may look at it and fill it out during the presentation. Or during an engineering a/v presentation, a detailed architectural diagram could print out for the user to look at and write on. Lastly, although the RTT fax print server 100 is directed towards printing on a fax machine, it could also be used for providing the same printing capabilities on a printer.

As was noted in the beginning of the Detailed Description, although it is termed a "real time transcription fax print server" in reference to the preferred embodiment, the print server according to the present invention does not necessarily translate "transcriptions", but may deal with graphics, images and the like, as has been described above. Furthermore, the print server according to the present invention does not necessarily output to a "fax", but may output to a printer, or to fax emulation software running on a processor. Lastly, the print server according to the present invention does not necessarily have "real time" input, but may take input from a storage means.

While the present invention has been described with respect to a certain preferred embodiment, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A system for providing a printing capability for a transcription service, comprising:
    a printing means;
    a transcription service for producing transcribed text; and
    a real time transcription (RTT) print server for receiving transcribed text output from said transcription service and translating the transcribed text output into a format compatible with said printing means, said RTT print server including a Multimedia Integration Module (MIM) for integrating video, images, or graphs into transcribed text output on the printing means, the RTT print server including:
    an Input/Output (I/O) communication module for providing an interface with the transcription service and the printing means;
    a Fax Connection Module for maintaining an active connection with the printing means;

an Audio Fragment Management Module (FMM) for buffering transcribed text into fragments and sending said fragments to be printed on the printing means;

a Control Module for controlling the real time transcription process, for directing signals in the RTT print server, for storing user preferences, and for storing information about at least one printing means;

a Multimedia Synchronization Module (MSM) for synchronizing multimedia signals with transcribed text output on the printing means, the MSM including a Signal Separator for separating out an audio and a video signal from a multimedia input signal; and a Synchronizer for receiving said separated audio and video signals, for time-aligning, if necessary, said separated audio and video signals, and for synchronizing said separated audio and video signals with transcribed text output from the FMM.

2. The system as recited in claim 1, wherein the printing means comprises a fax machine.

3. The system as recited in claim 1, wherein the printing means comprises a printer.

4. The system as recited in claim 1, wherein the printing means comprises a telex machine.

5. The system as recited in claim 1, wherein the transcription service comprises:
a stenograph writer; and
a processor for implementing a program which translates data input from the stenograph writer into transcribed text.

6. The system as recited in claim 1, wherein the transcription service comprises:
a microphone; and
an Automatic Speech Recognition (ASR) program running on a processor connected to said microphone.

7. The system as recited in claim 1, further comprising:
a network;
a connection between the printing means and the network;
a processor running the transcription service; and
a processor running the RTT print server.

8. The system as recited in claim 1, wherein the printing means is a fax machine, and the Fax Communication Module maintains an active communication link by sending delay frames to the fax machine.

9. The system as recited in claim 1, wherein the MIM comprises:
a Continuous-to-Discrete (C/D) Translator for receiving a continuously streaming video signal, for creating still images based on C/D Translator criteria, and for outputting said still images to an Image Buffer;
the Image Buffer for receiving still images, graphics, or diagrams, for storing said still images, graphics, or diagrams, and for outputting said still images, graphics, or diagrams to the printing means when an Interleaver directs it to do so; and
the Interleaver for interleaving still images, graphics, or diagrams between transcribed text on the printing means by directing the Image Buffer when to send still images, graphics, or diagrams to the printing means and by receiving transmission information from the FMM;
wherein said C/D Translator criteria comprises at least one of a time interval between snapshots, a location to crop a smaller still image inside a video image, a resolution for the still image, and a printed size for the still image on output from the printing means.

10. The system as recited in claim 1, wherein the granularity of fragments buffered by the FMM is adjustable, and ranges from words to complete sentences; and further wherein the FMM keeps each fragment whole on a single page.

11. The system as recited in claim 1, wherein the transcription service is part of a multimedia presentation, further comprising:
at least one display means for displaying a video signal from the multimedia presentation; and
at least one speaker for playing an audio signal of the multimedia presentation;
wherein the at least one display means comprises at least one of a computer monitor, a television screen, a Personal Digital Assistant (PDA) display, and a display in an embedded device.

12. The system as recited in claim 1, further comprising:
a processor for running the transcription service and the RTT print server, said processor being in a Personal Digital Assistant (PDA); and
a communication link between said PDA and the printing means.

13. The system as recited in claim 1, wherein the Control Module has a Graphical User Interface (GUI) module which provides a graphical interface on a display, wherein the GUI allows a user to input control parameters and preferences concerning real-time transcription.

14. The system as recited in claim 1, further comprising:
at least one other printing means;
wherein the MSM synchronizes transcribed text to be output on the printing means and the at least one other printing means.

15. The system of claim 1, further comprising:
a processor running fax emulation software;
a display means operatively connected to said processor; and
wherein said RTT print server receives transcribed text output from said transcription service and translates it into a format compatible with said fax emulation software.

16. A method for providing a printing capability for a real time transcription service, comprising the steps of:
receiving information concerning at least one printing means;
receiving a user's instructions and parameters concerning a real-time transcription;
receiving transcribed text from a transcription service;
translating the transcribed text into a format compatible with the at least one printing means; and
maintaining an active connection with the at least one printing means,
wherein the step of maintaining an active connection with the at least one printing means comprises the sub-step of sending a delay frame to the at least one printing means.

17. The method as recited in claim 16, wherein the translating step comprises the sub-step of:
integrating video, images, or graphics into transcribed text output on the at least one printing means.

18. The method as recited in claim 17, wherein the integrating sub-step comprises the steps of:
receiving a continuously streaming video signal;
creating still images from the continuously streaming video signal based on still image criteria;
outputting said still images to an Image Buffer;
storing still images, graphics, or diagrams in an Image Buffer;

interleaving stored still images, graphics, or diagrams between transcribed text as output on the at least one printing means;

wherein said still image criteria comprises at least one of a time interval between still images, a location to crop a smaller still image inside a video image, a resolution for the still image, and a printed size for the still image in output from the printing means.

19. The method as recited in claim 16, wherein the translating step comprises the sub-step of:

synchronizing multimedia signals with transcribed text output on the at least one printing means.

20. The method as recited in claim 19, wherein the synchronizing sub-step comprises the steps of:

separating out an audio and a video signal from a multimedia input signal;

time-aligning, if necessary, said separated audio and video signals; and synchronizing said separated audio and video signals with transcribed text output from the at least one printing means.

21. The method as recited in claim 16, wherein the translating step comprises the sub-step of:

buffering transcribed text into fragments; and sending said fragments to be printed on the at least one printing means.

22. The method as recited in claim 21, wherein the granularity of fragments in the buffering sub-step is adjustable, and ranges from words to complete sentences, the buffering sub-step comprising the sub-sub-step of:

keeping each fragment whole on a single page.

23. The method as recited in claim 16, further comprising the steps of:

displaying a video signal from a multimedia presentation on at least one displaying means; and playing an audio signal of the multimedia presentation on at least one speaker;

wherein the transcription is part of said multimedia presentation; and wherein the at least one displaying means comprises at least one of a computer monitor, a television screen, a Personal Digital Assistant (PDA) display, and a display in an embedded device.

24. The method as recited in claim 16, further comprising the step of:

providing a Graphical User Interface (GUI) on a display, said GUI allowing a user to input control parameters and preferences concerning real-time transcription.

25. The method of claim 16, further comprising the steps of:

running fax emulation software on a processor;

receiving information concerning a display means, said display means operatively connected to said processor;

receiving the transcribed text from the transcription service and translating the transcribed text into a format compatible with the fax emulation software; and maintaining an active connection with the fax emulation software.

26. A computer system for providing a printing capability for a real time transcription service, the computer system comprising:

at least one computer-readable medium including:

code that receives information concerning at least one printing means;

code that receives a user's instructions and parameters concerning a real-time transcription;

code that receives transcribed text from a transcription service;

code that translates the transcribed text into a format compatible with the at least one printing means, the code that translates the transcribed text into a format compatible with the at least one printing means comprises code that integrates video, images, or graphics into transcribed text output on the at least one printing means; and code that maintains an active connection with the at least one printing means including code that maintains an active communication link by sending delay frames to the at least one printing means.

27. The computer system as recited in claim 26, wherein the code that translates the transcribed text into a format compatible with the at least one printing means comprises:

code that buffers transcribed text into fragments; and code that sends said fragments to be printed to the at least one printing means.

28. The computer system as recited in claim 27, wherein the code that integrates video, images, or graphics into transcribed text output on the at least one printing means comprises:

code that receives a continuously streaming video signal;

code that creates still images from the continuously streaming video signal based on still image criteria;

code that outputs said still images to an Image Buffer;

code that stores still images, graphics, or diagrams in an Image Buffer;

code that interleaves stored still images, graphics, or diagrams between transcribed text as output on the at least one printing means;

wherein said still image criteria comprises at least one of a time interval between still images, a location to crop a smaller still image inside a video image, a resolution for the still image, and a printed size for the still image as output from the printing means.

29. The computer system as recited in claim 26, wherein the code that translates the transcribed text into a format compatible with the at least one printing means comprises:

code that synchronizes multimedia signals with transcribed text output on the at least one printing means;

code that buffers transcribed text into fragments; and code that sends said fragments to be printed to the at least one printing means.

30. The computer system as recited in claim 29, wherein the code that synchronizes multimedia signals with transcribed text output on the at least one printing means comprises:

code that separates out an audio and a video signal from a multimedia input signal;

code that time-aligns, if necessary, said separated audio and video signals; and code that synchronizes said separated audio and video signals with transcribed text output from the at least one printing means.

31. The computer system as recited in claim 26, wherein the code that translates the transcribed text into a format compatible with the at least one printing means comprises:

code that buffers transcribed text into fragments;

code that keeps each fragment whole on a single page; and code that sends said fragments to be printed to the at least one printing means;

wherein the granularity of fragments in the code that buffers is adjustable, and ranges from words to complete sentences.

32. The computer system as recited in claim 26, further comprising:

at least one computer-readable medium including:
code that displays a video signal from a multimedia presentation on at least one display means;
code that plays an audio signal of the multimedia presentation on at least one speaker;
wherein the transcription is part of said multimedia presentation; and
wherein the at least one display means comprises at least one of a computer monitor, a television screen, a Personal Digital Assistant (PDA) display, and a display in an embedded device.

33. The computer system as recited in claim 26, wherein all the code is run on a Personal Digital Assistant (PDA).

34. The computer system as recited in claim 26, wherein the at least one computer-readable medium further includes:
code that provides a Graphical User Interface (GUI) on a display, said GUI allowing a user to input control parameters and preferences concerning real-time transcription.

35. The computer system of claim 26, wherein the at least one computer-readable medium further comprises:
code that emulates a fax machine, said emulation including code that displays received fax data on a display means;
code that receives information concerning said display means;
code that translates the transcribed text into a format compatible with the code that emulates a fax machine; and
code that maintains an active connection with the code that emulates a fax machine.

36. A system for providing a printing capability for a transcription service, comprising:
a printing means;
a transcription service for producing transcribed text; and
a real time transcription (RTT) print server for receiving transcribed text output from said transcription service and translating the transcribed text output into a format compatible with said printing means, said RTT print server including a Multimedia Integration Module (MIM) for integrating video, images, or graphs into transcribed text output on the printing means, wherein the MIM includes:
a Continuous-to-Discrete (C/D) Translator for receiving a continuously streaming video signal, for creating still images based on C/D Translator criteria, and for outputting said still images to an Image Buffer;
the Image Buffer for receiving still images, graphics, or diagrams, for storing said still images, graphics, or diagrams, and for outputting said still images, graphics, or diagrams to the printing means when an Interleaver directs it to do so; and
the Interleaver for interleaving still images, graphics, or diagrams between transcribed text on the printing means by directing the Image Buffer when to send still images, graphics, or diagrams to the printing means and by receiving transmission information from the FMM;
wherein said C/D Translator criteria comprises at least one of a time interval between snapshots, a location to crop a smaller still image inside a video image, a resolution for the still image, and a printed size for the still image on output from the printing means.

37. A system for providing a printing capability for a transcription service, comprising:
a printing means;
a transcription service for producing transcribed text; and
a real time transcription (RTT) print server for receiving transcribed text output from said transcription service and translating the transcribed text output into a format compatible with said printing means, said RTT print server including a Multimedia Integration Module (MIM) for integrating video, images, or graphs into transcribed text output on the printing means, the RTT print server including:
an Input/Output (I/O) communication module for providing an interface with the transcription service and the printing means;
a Fax Connection Module for maintaining an active connection with the printing means;
the Audio Fragment Management Module (FMM) for buffering transcribed text into fragments and sending said fragments to be printed on the printing means; and
a Control Module for controlling the real time transcription process, for directing signals in the RTT print server, for storing user preferences, and for storing information about at least one printing means;
wherein the granularity of fragments buffered by the FMM is adjustable, and ranges from words to complete sentences; and further wherein the FMM keeps each fragment whole on a single page.

38. A computer system for providing a printing capability for a real time transcription service, the computer system comprising:
at least one computer-readable medium including:
code that receives information concerning at least one printing means;
code that receives a user's instructions and parameters concerning a real-time transcription;
code that receives transcribed text from a transcription service;
code that translates the transcribed text into a format compatible with the at least one printing means, the code that translates the transcribed text into a format compatible with the at least one printing means includes code that integrates video, images, or graphics into transcribed text output on the at least one printing means, code that buffers transcribed text into fragments, and code that sends said fragments to be printed to the at least one printing means; and
code that maintains an active connection with the at least one printing means;
wherein the code that integrates video, images, or graphics into transcribed text output on the at least one printing means includes code that receives a continuously streaming video signal, code that creates still images from the continuously streaming video signal based on still image criteria, code that outputs said still images to an Image Buffer, code that stores still images, graphics, or diagrams in an Image Buffer, and code that interleaves stored still images, graphics, or diagrams between transcribed text as output on the at least one printing means; and further wherein said still image criteria comprises at least one of a time interval between still images, a location to crop a smaller still image inside a video image, a resolution for the still image, and a printed size for the still image as output from the printing means.

39. A computer system for providing a printing capability for a real time transcription service, the computer system comprising:
   at least one computer-readable medium including:
   code that receives information concerning at least one printing means;
   code that receives a user's instructions and parameters concerning a real-time transcription;
   code that receives transcribed text from a transcription service;
   code that translates the transcribed text into a format compatible with the at least one printing means, the code that translates the transcribed text into a format compatible with the at least one printing means includes code that integrates video, images, or graphics into transcribed text output on the at least one printing means, code that synchronizes multimedia signals with transcribed text output on the at least one printing means, code that buffers transcribed text into fragments, and code that sends said fragments to be printed to the at least one printing means; and
   code that maintains an active connection with the at least one printing means;
   wherein the code that synchronizes multimedia signals with transcribed text output on the at least one printing means includes code that separates out an audio and a video signal from a multimedia input signal, code that time-aligns, if necessary, said separated audio and video signals; and code that synchronizes said separated audio and video signals with transcribed text output from the at least one printing means.

40. A computer system for providing a printing capability for a real time transcription service, the computer system comprising:
   at least one computer-readable medium including:
   code that receives information concerning at least one printing means;
   code that receives a user's instructions and parameters concerning a real-time transcription;
   code that receives transcribed text from a transcription service;
   code that translates the transcribed text into a format compatible with the at least one printing means, the code that translates the transcribed text into a format compatible with the at least one printing means comprises code that integrates video, images, or graphics into transcribed text output on the at least one printing means; and
   code that maintains an active connection with the at least one printing means;
   wherein the code that translates the transcribed text into a format compatible with the at least one printing means includes code that buffers transcribed text into fragments, code that keeps each fragment whole on a single page, and code that sends said fragments to be printed to the at least one printing means, wherein the granularity of fragments in the code that buffers is adjustable, and ranges from words to complete sentences.

* * * * *